UNITED STATES PATENT OFFICE.

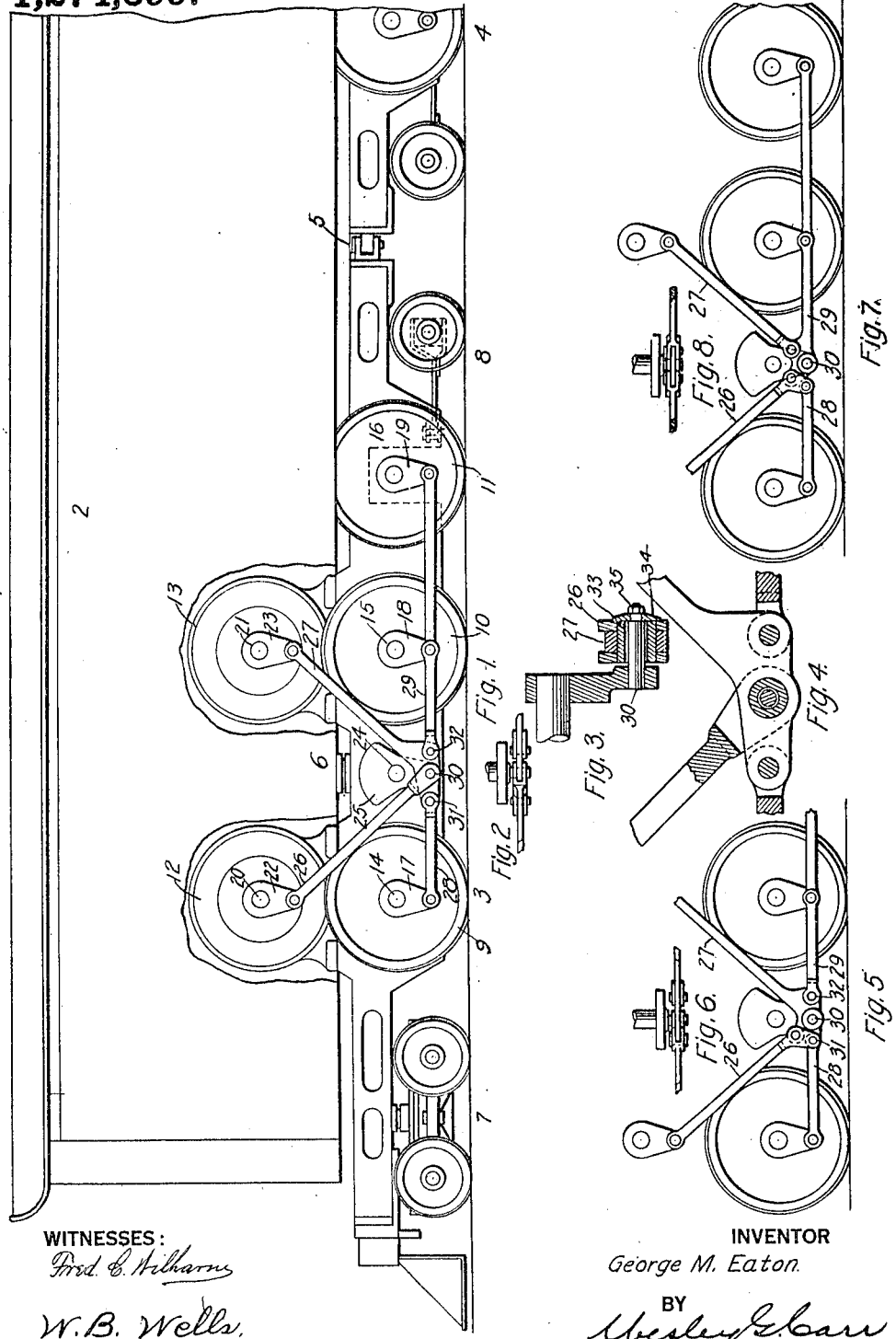

GEORGE M. EATON, OF PITTSBURGH, PENNSYLVANIA, ASSIGNOR TO WESTINGHOUSE ELECTRIC & MANUFACTURING COMPANY, A CORPORATION OF PENNSYLVANIA.

LOCOMOTIVE DRIVING MECHANISM.

1,274,399. Specification of Letters Patent. Patented Aug. 6, 1918.

Application filed December 14, 1916. Serial No. 136,875.

*To all whom it may concern:*

Be it known that I, GEORGE M. EATON, a citizen of the United States, and a resident of Pittsburgh, in the county of Allegheny and State of Pennsylvania, have invented a new and useful Improvement in Locomotive Driving Mechanism, of which the following is a specification.

My invention relates to locomotives and particularly to the connecting means between the propelling motors and the driving wheels of electric locomotives.

One object of my invention is to provide a locomotive which shall have the motors thereof so disposed relative to the driving wheels that the weight of the driving connections may be greatly reduced and smooth running characteristics insured when operating at high speeds.

Another object of my invention is to provide a locomotive of the above-indicated character which shall have the motor and the side rods so located relative to each other that the center lines thereof radiate from one point which rotates about a substantially-fixed center.

Another object of my invention is to provide a locomotive of the above-indicated character which shall be provided with motors and side-rod connecting means between the propelling motors and the driving wheels, and a jack shaft which prevents lateral vibration of the rod connecting means and permits the rod system to have a limited free movement relative thereto in the vertical plane of the rod system.

A further object of my invention is to provide a locomotive having two motor rods and two side rods for joining the propelling motors to the driving wheels, one of the rods having direct pivotal connections with two other of the rods.

More specifically, my invention embodies a locomotive provided with two articulated running gears each of which comprises two auxiliary trucks, a plurality of pairs of driving wheels, two motors disposed substantially above the driving wheels, two motor and two side rods for transmitting the driving effort of the motors to the driving wheels in an efficient manner, and a jack shaft so connected to the driving rods as to prevent the lateral vibration of the rods and insure smooth running characteristics.

In the accompanying drawing, Figure 1 is an elevational view of a portion of a locomotive constructed in accordance with my invention; Fig. 2 is a plan view of a portion of the rod connecting means illustrated in Fig. 1; Figs. 3 and 4 are sectional views of the jack shaft illustrated in Fig. 1; Figs. 5 and 6 are side elevational and plan views, respectively, of portions of a modification of my invention in which one of the motor rods is directly pinned to the other motor rod and to one of the side rods and the other side rod is directly pinned to a motor rod; Figs. 7 and 8 are side elevational and plan views, respectively, of portions of a modification in which one of the side rods is directly pinned to the two motor rods and one of the motor rods is directly pinned to the other side rod.

Referring to Fig. 1 of the drawing, a locomotive 1 embodies a cab 2 and two articulated running gears 3 and 4 which are connected together by the articulated connection 5 and are pivotally connected to the cab 2 by means of the pivotal connections 6, one only of which is illustrated. Each of the running gears embodies a four-wheel outer pivotal truck 7, a two-wheel radial inner truck 8, three pairs of driving wheels 9, 10 and 11 and two motors 12 and 13 which are mounted substantially above the driving wheels. The driving wheels are provided with axles 14, 15 and 16 which have cranks 17, 18 and 19 mounted thereon, and the motors 12 and 13 are provided with armature shafts 20 and 21 which have cranks 22 and 23 mounted thereon. A jack shaft 24, having cranks 25 mounted thereon, is disposed between the two pairs of driving wheels 9 and 10. Motor rods 26 and 27 are respectively pinned to the motor cranks 22 and 23, side rods 28 are pinned to the driving cranks 17 which are mounted on the axle 14, and side rods 29 are pinned to the driving cranks 18 and 19 which are mounted on the axles 15 and 16. The three rods 26, 28 and 29 on each side of the locomotive are provided with bifurcated end portions which include end portions of the motor rod 26 between the arms thereof and are pinned to the motor rod 26 by the jack shaft pin 30 and pins 31 and 32.

Referring to Figs. 3 and 4, the motor rods 26 and 27 are directly mounted on bushings 33 which are loosely fitted to the jack-shaft pins 30 so that motor and side rods on each side of the locomotive may have limited free movement relative to the jack shaft in the plane of each rod system. Each of the jack-shaft pins 30, however, is provided with a washer 34 and a nut 35 for preventing any lateral vibration of the motor rods 26 and 27.

In describing Figs. 5 to 8, inclusive, the various elements are designated by reference characters corresponding to those used in Figs. 1 to 4, inclusive. In the modification illustrated in Figs. 5 and 6, each motor rod 27 is mounted on one of the jack-shaft pins 30, and the motor rods 26 and the side rods 29 are provided with bifurcated end portions which are pinned to end portions of the motor rods 27. The bifurcated end portion of each motor rod 26 also includes an end portion of the side rod 28 between the arms thereof and is pinned thereto by the pin 31.

In the modification illustrated in Figs. 7 and 8, the motor rod 26 is provided with a bifurcated end portion which is pinned to end portions of the two side rods 28 and 29, and the motor rod 27 is provided with a bifurcated end portion which is pinned to the side rod 28. The side rod 28, in this modification, is mounted on the jack-shaft pin 30.

Variations in the structure, arrangement and location of parts may be made without departing from the spirit and scope of my invention, and such modifications are intended to be covered in the appended claims.

I claim as my invention:

1. In a locomotive, the combination with a plurality of driving wheels and a plurality of propelling motors, of a jack shaft, a crank and a crank pin at each end of said jack shaft, pairs of side rods and pairs of motor rods pivotally connected together on each side of said locomotive, one rod on each side of the locomotive being pivotally connected to the adjacent crank by one of said crank pins.

2. In a locomotive, the combination with a plurality of pairs of driving wheels and a plurality of motors mounted above said driving wheels, of a jack shaft, two motor rods and two side rods for connecting said motors to the driving wheels, said motor rods being pivotally connected together and to said jack shaft and the two side rods having independent pivotal connections to one of said motor rods.

3. In an electric locomotive, the combination with a plurality of driving wheels and a plurality of propelling electric motors, of a jack shaft, a crank and a crank pin at each end of said jack shaft, pairs of side rods and pairs of motor rods pivotally connected together on each side of the locomotive for connecting the motors to the driving wheels, one of said rods on each side of the locomotive having an enlarged end pivoted on the adjacent crank pin.

4. In an electric locomotive, the combination with a plurality of driving wheels and a plurality of propelling electric motors, of a jack shaft, a crank and a crank pin at each end of said jack shaft, pairs of side rods and pairs of motor rods pivotally connected together on each side of the locomotive for connecting the motors to the driving wheels, one of said rods on each side of the locomotive having an enlarged end pivoted on the adjacent crank pin, and one of the side rods being pivotally connected to an extension on one of the motor rods.

5. In a locomotive, a jack shaft, two motor rods pivotally mounted on said jack shaft, and two side rods having independent pivotal connections with one of said motor rods.

6. In a locomotive, a jack shaft, two motor rods pivotally mounted on said jack shaft, and two side rods disposed in the same vertical plane with said motor rods and having independent pivotal connections to one of said motor rods.

7. In a locomotive, two motor rods and two side rods disposed in the same vertical plane, and a jack shaft connected to one of said rods, said last-mentioned rod having independent pivotal connections to two other of said rods.

8. In a locomotive, the combination with a plurality of driving wheels and a plurality of motors mounted above said driving wheels, of a jack shaft, a plurality of motor rods and a plurality of side rods for connecting said motors to the driving wheels, one of said rods having a connection to said jack shaft and having independent pivotal connections to two other of said rods.

In testimony whereof, I have hereunto subscribed my name this 24th day of Nov. 1916.

GEORGE M. EATON.